A. C. EEK.
PIPE CLEANER.
APPLICATION FILED APR. 30, 1914.
1,144,759.
Patented June 29, 1915.
3 SHEETS—SHEET 1.
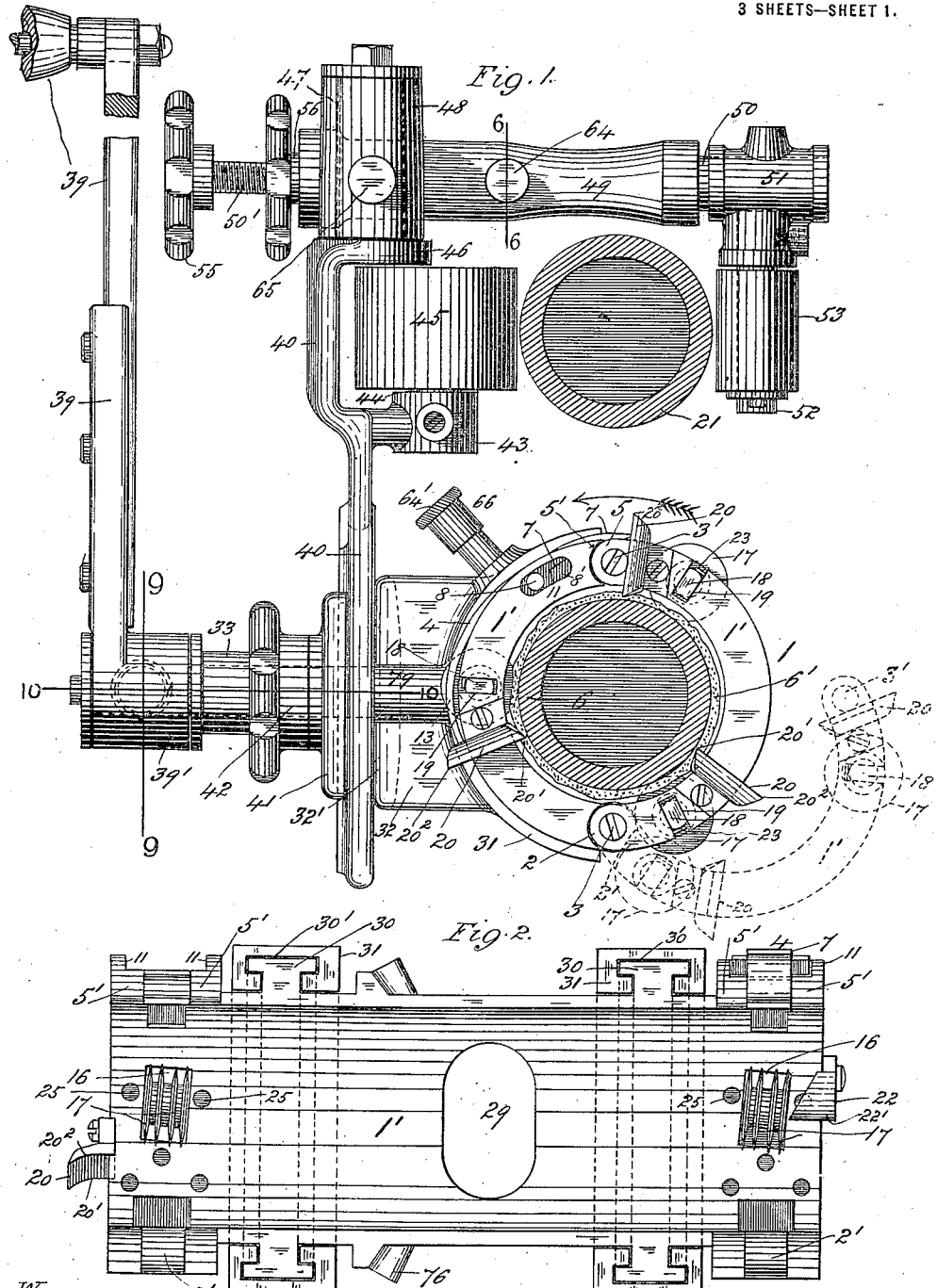
WITNESSES:
Harry H. Reise.
George G. Anderson.
INVENTOR:
ALBIN C. EEK,
By Hugh K. Wagner,
HIS ATTORNEY.

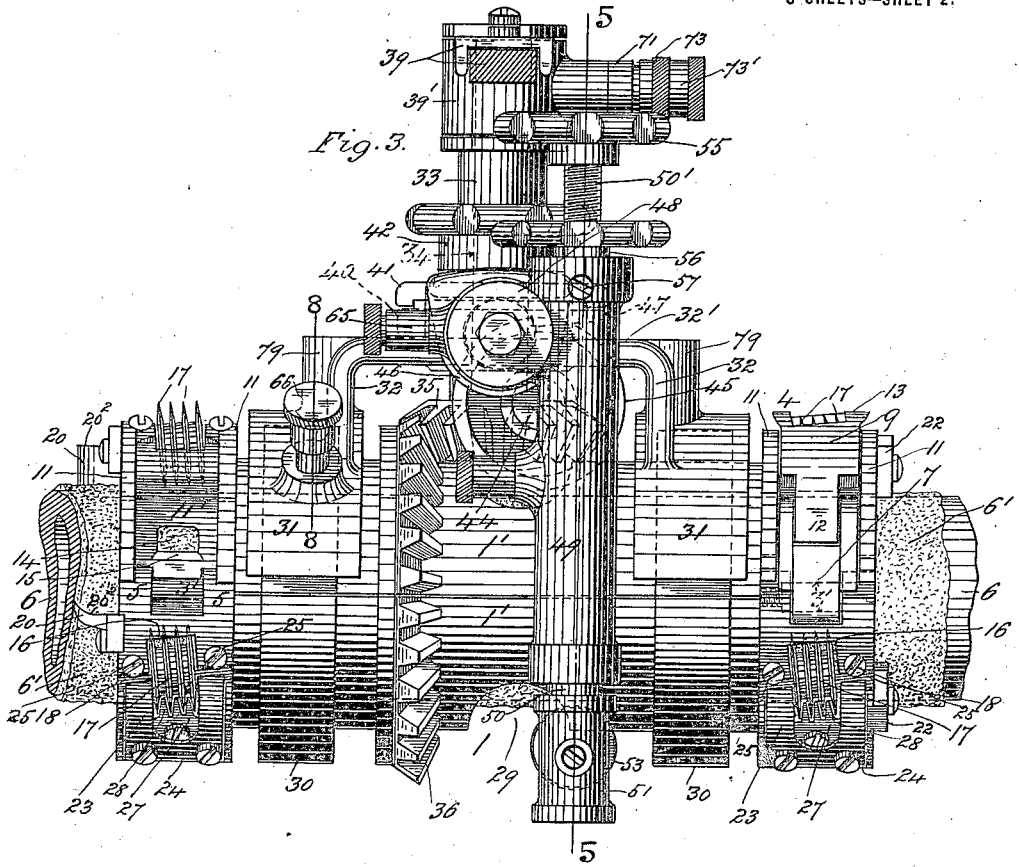
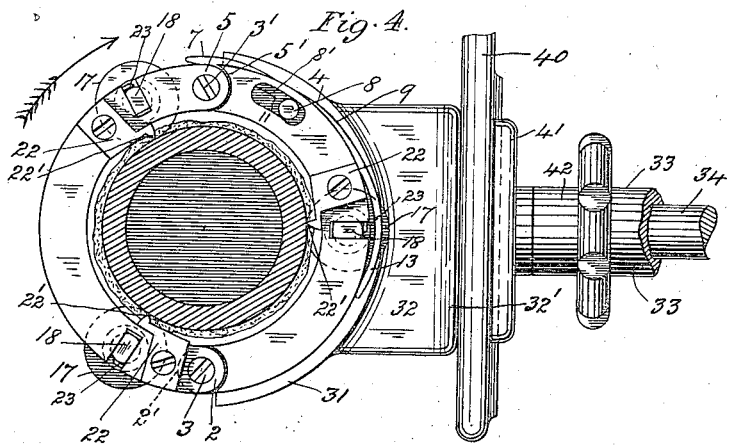

A. C. EEK.
PIPE CLEANER.
APPLICATION FILED APR. 30, 1914.
1,144,759.
Patented June 29, 1915.
3 SHEETS—SHEET 3.
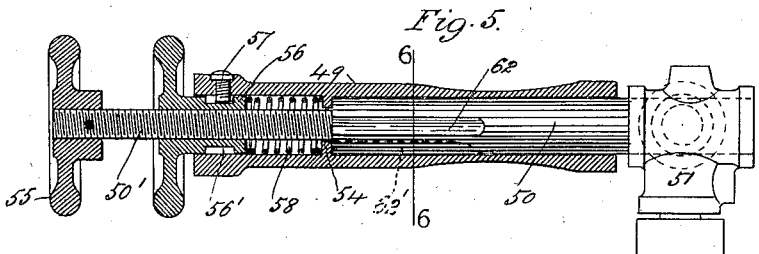
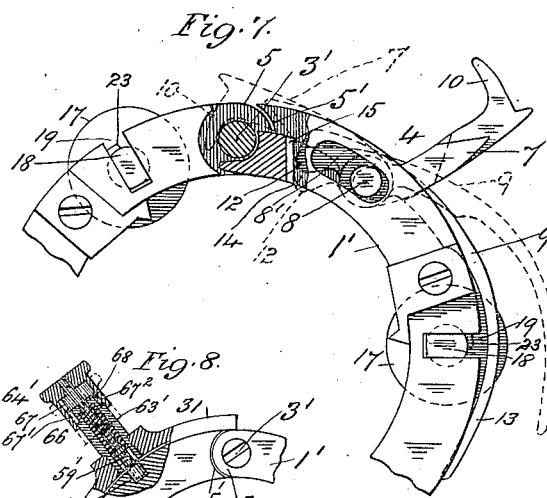
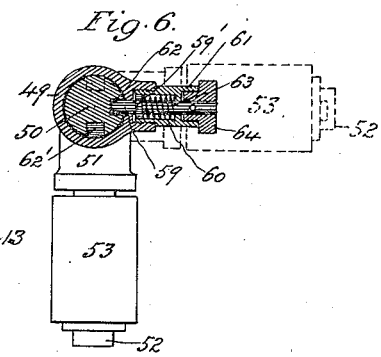
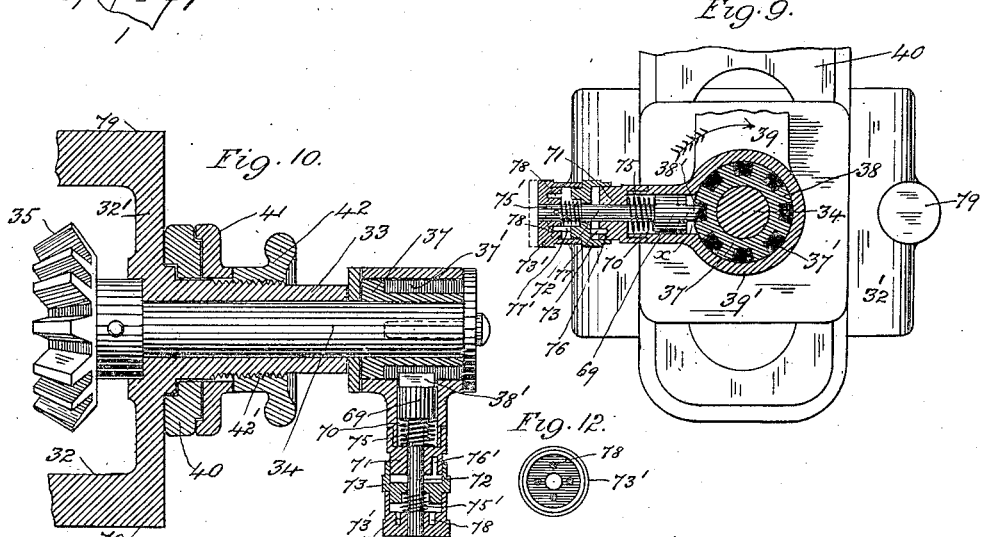
WITNESSES:
Harry H. Reiss
George G. Anderson
INVENTOR:
ALBIN C. EEK,
By Hugh K. Wagner
HIS ATTORNEY.

UNITED STATES PATENT OFFICE.

ALBIN C. EEK, OF WEBSTER GROVES, MISSOURI, ASSIGNOR, BY MESNE ASSIGNMENTS, TO ESSANESS MANUFACTURING COMPANY, OF ST. LOUIS, MISSOURI, A CORPORATION OF MISSOURI.

PIPE-CLEANER.

1,144,759.     Specification of Letters Patent.     Patented June 29, 1915.

Application filed April 30, 1914. Serial No. 835,561.

*To all whom it may concern:*

Be it known that I, ALBIN C. EEK, a citizen of the United States, residing at the city of Webster Groves, in the county of St. Louis and State of Missouri, have invented certain new and useful Improvements in Pipe-Cleaners, of which the following is a specification.

My invention relates to improvements in that class of pipe cleaner used particularly for removing the scale from the outside of ammonia condenser pipes and the like, and consisting principally of a cylinder made in halves longitudinally which are jointed to each other hinge-wise at one side of the cylinder and separably locked together at the opposite side along their respective meeting edges, for enabling the halves of the cylinder to be readily placed and subsequently closed around the pipe to be cleaned, the cylinder carrying circular cutters which are revoluble in a plane inclined to the axis of the cylinder and having their peripheral cutting edges projecting within the cylinder for engaging the scale on the pipe, so that, on rotation of the cylinder, the spiral action of the cutters in their passage through the scale will cause the cylinder to travel along the pipe. Combined with the cylinder is a member adapted to support the same and to travel therewith in the longitudinal direction of the pipe, the said member carrying means for rotating the cylinder around the pipe, and for preventing the rotation of the said member around the cylinder.

My invention consists in features of novelty in connection with the various parts of the pipe cleaner above-mentioned, as hereinafter particularly described and claimed, reference being had to the accompanying drawing forming part of this specification, wherein like numbers of reference denote like parts wherever they occur, and, Figure 1 is a front elevation of my improved pipe cleaner; Fig. 2 is an inside face view of the left-hand half of the cylinder forming part of the pipe cleaner as seen in Fig. 1, detached; Fig. 3 is a top plan view of the pipe cleaner, omitting the upper pipe seen in Fig. 1; Fig. 4 is a rear end view of the cylinder and corresponding view of its combined parts (broken away); Fig. 5 is a vertical longitudinal section on the line 5—5, Fig. 3, of the tubular arm or bracket projecting from the cylinder support, showing means for regulating the distance between the outer roller and the corresponding side of the upper pipe seen in Fig. 1; Fig. 6 is a vertical transverse section through the same on the line 6—6, Figs. 1 and 5, showing means for locking the outer roller in the vertical or horizontal position; Fig. 7 is an end view, on an enlarged scale, corresponding to Fig. 4, of the cylinder (broken away) showing the device for tightly closing and locking the halves of the cylinder when in position around the pipe to be cleaned; Fig. 8 is a longitudinal section on the line 8—8, Fig. 3, through the pawl for locking the cylinder to its supporting member while placing the cylinder in position around the pipe to be cleaned; Fig. 9 is a vertical transverse section on the line 9—9, Fig. 1, looking from the left, through the hub of the operating handle or lever and combined reversible ratchet for rotating the cylinder in either direction; Fig. 10 is a horizontal section of the same on the line 10—10, Fig. 1; Fig. 11 is an outer end view of the socketed projection from the said hub for receiving the ratchet pawl; and Fig. 12 is an inner face view of the outer cap combined with the socketed projection for partly controlling the said ratchet.

Ordinarily the pipes of ammonia condensers and the like are arranged comparatively close and parallel to each other and connected together at the ends for which reason the pipe cleaner is preferably adapted to be placed around the pipe to be cleaned from the side of the latter thereby obviating the necessity of disconnecting the end of the pipe.

Referring generally to Figs. 1 to 4, 1 represents a cylinder or drum which is preferably made in halves 1' longitudinally, the halves 1' being jointed to each other hinge-wise along their meeting edges at one side of the cylinder 1, by pins 3 which pass through lugs 2, 2', projecting from the said edges respectively, preferably at each end thereof, while the halves 1' are tightly closed and locked together at the opposite side of the cylinder 1 by a suitable locking device 4 (hereinafter particularly described), one at each end of the cylinder 1, which is adapted to engage a joint pin 3' carried by lugs 5 which project from the edge thereat of one of the halves 1' of the cylinder 1 and are adapted to engage in corresponding concavities 5' formed in the edge of the other half 1', so that, in the closed position of the halves 1', the inner and outer cylindrical surfaces of the cylinder 1 are practically continuous circumferentially, the meeting edges of the halves 1' being so shaped that on releasing the locking devices 4 from the pins 3' the halves 1' are separable and movable outward from each other about their hinges 3, as indicated by dotted lines in Fig. 1, whereby the cylinder 1 can be readily adjusted to and closed around the pipe 6 to be cleaned, and subsequently removed therefrom without the necessity of disconnecting the ends of the latter.

Each locking device consists preferably of an arm or catch 7 pivoted on the fulcrum pin 8 of a locking lever 9 of the first kind, and formed at its other or free end with a hook 10 which is adapted to pass over and engage the joint pin 3' of the halves 1' as indicated by dotted lines in Fig. 7, the fulcrum pin 8 passing horizontally through and movable along two opposite slots 8' which are formed transversely through the side walls 11 of a recess 11' (seen to the left in Fig. 3, the device being omitted therefrom) which is formed in the circumferential part of the cylinder 1 for receiving the catch 7 and the lever 9, the latter comprising a short arm 12 having its free end rounded and extending from the fulcrum 8 toward the joint pin 3', and an operating arm 13 which extends partly around the cylinder 1 normally within the recess 11', through which, adjacent to the joint pin 3', is an opening 14 having on its wall between the rounded end of the lever 9 and the joint pin 3' a friction plate 15 which in the normal position of the parts as shown by full lines in Fig. 7, is just clear of the said end, the whole operating so that, when the catch 7 is thrown into engagement with the joint pin 3' and the lever 9 outward into the dotted positions, by pressing upon and returning the lever 9 to its normal position the rounded end of its short arm 12 will bear hard against the friction plate 15, and in so doing constrain the fulcrum pin 8 into the dotted position and thereby cause the hook 10 of the catch 7 to pull transversely on and tightly close the meeting edges of the halves 1' of the cylinder 1.

Through the cylindrical wall preferably of each end portion of the cylinder 1, are formed a series of openings 16 which, in the present case, are preferably three in number, equidistant from each other around the cylinder 1, and in each opening 16 are mounted side by side in a plane inclined to the axis of the cylinder 1, a series of circular cutters 17, preferably four as shown, which are freely revoluble on a shaft 18 arranged parallel to the axis of the cylinder 1 and flattened on two opposite sides between each end thereof and the assembled cutters 17, the flattened portions of the shaft 18 being supported and adjustable in correspondingly shaped notches 19 formed in, and through the outer and inner faces of the end portion of the cylinder 1, and opening through the periphery thereof. Each series of cutters 17 is preferably integral, the cutters 17 being respectively united to each other by a central hub and thence tapering to its periphery which forms a cutting edge, the cutters 17 being so arranged that their cutting edges project within the cylinder 1 sufficiently for cutting through the scale 6' as far as the outer surface of the pipe 6, so that, on rotating the cylinder 1, as hereinafter more particularly referred to, the spiral action of the inclined cutters 17 will cause the cylinder 1 to travel along the pipe 6.

For initially breaking up and removing enough scale 6' from the pipe 6 to allow the cylinder or drum 1 to pass thereover, a series of cutters 20 are adjustably fixed to the cylinder 1 at suitable intervals around and in advance of its front end, the cutting edges 20' of each cutter 20 extending inward as far as or approximately to the outer surface of the pipe 6, and its outer cutting edge $20^2$ extending sufficiently far for removing any abnormal deposit of scale on the succeeding pipe 21 above or on the succeeding pipe (not shown) below the pipe 6. Furthermore, a series of scrapers 22 are fixed to the cylinder 1 at suitable intervals around its rear end (Fig. 4), the scraping edge 22' of each scraper 22 extending inward as far as the outer surface of the pipe 6 for completely removing the remaining scale therefrom.

For holding the axle 18 of each series of circular cutters 17 in place within its bearings or notches 19, and at the same time allowing a resilient adjustable movement thereof when the cutters 17 are in engagement with the scale 6' on the pipe 6, I use preferably, a bifurcated plate 23 (Fig. 3) of resilient material which is secured at one end to the bottom of a peripheral recess 24 formed in the end portion of the cylinder 1, its bifurcated free ends bearing on the axis 18 between each end thereof and the cutter 17, and in this connection, also, screws 25 are threaded into the periphery of the said end portion adjacent to the notches 19, the heads of the screws 25 overlapping the flattened portions of the axis 18 thereat and thereby preventing undue outward play thereof. Furthermore, I preferably use in combination with each series of circular cutters 17, a cleaning device consisting of a plate 27 which is secured at one end to the bottom of the peripheral recess 24 between the bifurcated branches of the resilient plate 23 and formed with teeth 28 which correspond in shape with and project into the spaces between the cutters 17, and between their peripheral cutting edges and central hub, whereby any accumulation of scale and consequent clogging of the cutters 17 is obviated.

Suitable openings 29 are formed through the cylindrical wall of the cylinder 1 for allowing the scale removed from the pipe 6 by the circular cutters 17 to escape from the interior of the cylinder 1.

For supporting and enabling the cylinder 1 to be rotated around the pipe 6 to be cleaned, the cylinder 1 is formed circumferentially adjacent to each end portion thereof with a circular projecting rib 30 (Fig. 2) which is preferably T-shaped in cross section and adapted to freely revolve within a correspondingly shaped recess 30' formed in the inner face of a practically semi-circular yoke 31, the said face, and recess 30' radially corresponding to the radius of the circumferential surface of the cylinder 1 between its end portions and that of the rib 30 respectively. Projecting rearwardly from each yoke 31 is a leg 32, the two legs 32 being united to each other at a suitable distance from the cylinder 1 by a cross-bar 32' which with the legs 32 straddles the middle portion of the cylinder 1 thereat between the yokes 31. On the outer or rear side of the cross-bar 32' is an elongated projecting hub 33 through which passes and has its bearing a shaft 34 having its longitudinal center intersectional with the axis of the cylinder 1. On the inner end of the shaft 34 between the cross-bar 32' and the outer surface of the cylinder 1 is fixed preferably, a bevel pinion 35 which is adapted to engage in a bevel 36 made in halves which are preferably integral with (but may be separate from and fixed to) the corresponding halves 1', respectively, of the cylinder 1 and form, when the latter is tightly closed, a continuous gearing around the same, while on the other or outer end of the shaft 34 is fixed a sleeve 37 having a series of longitudinal grooves 37' in its circumference at an equal distance apart so as to form ratchet-teeth 38 which are adapted to be engaged by a pawl 38' carried by a handle, lever or bar 39 whereby the shaft 34 and with it the bevel gears 36, 37, and cylinder 1 are rotated in either direction as hereinafter more particularly referred to.

For preventing the rotation of the yokes 31 with their appendage around the cylinder 1 when rotating the latter by the handle or lever 39 and bevel pinion 35 as above-mentioned there is placed around and at right-angles to the shaft 34 between the cross-bar 32' of the supporting member 32, 32', and the handle or lever 39, a slidable bar 40 which is arranged flatwise against the outer face of the cross-bar 32', in the hub 33 of the said member passing through a longitudinal slot in the bar 40 and freely through a rectangular-shaped washer-plate 41 which is normally held against the outer face of the bar 40 by a nut 42 in engagement with the screw-threaded portion 42' of the hub 33, so that, on turning the nut 42 in one direction the washer-plate 41 is tightened against the bar 40 and the latter thereby tightened and held in the desired position against supporting member 32, 32', and on turning the nut 42 in the opposite direction the bar 40 is released from the said member and by means of its slot 40' can be raised or lowered or rotated and adjusted about the hub 33 in any desired direction.

From the inner side of the bar 40 near its upper end (assuming the parts to be in their relative positions as shown) projects a horizontal bracket 43 having a vertically projecting pin 44 on which is axially mounted and freely revoluble in a vertical plane, a roller 45 which by adjusting the bar 40 as before described, is arranged opposite to and circumferentially approximately in contact with one side of the succeeding pipe 21 above the pipe 6 to be cleaned. From the inner side of the bar 40 at its upper end above the roller 45 projects a horizontal bracket 46 having a vertically projecting pin 47 on which is axially mounted and rotatably adjustable, a sleeve 48 carrying on one side a horizontally arranged tubular arm 49 (see particularly Figs. 5 and 6) through which is adapted to slide longitudinally a circular spindle 50 which projects beyond one end of the arm 49, and on this projecting portion of the latter is fixed a T-shaped connection 51 having a projecting pin 52 at right-angles to the arm 49 and spindle 50, and on the pin 52 is axially mounted a roller 53 which is opposite to the roller 45 and approximately in contact with the other side of the succeeding pin 21 above the pipe 6, whereby, when rotating the cylinder 1 by the handle or lever 39, owing to the rollers 45 and 53 bearing against the pipe 21, and the bar 40 rigidly held to the supporting member 32, 32', the latter with its appendages is prevented from rotating around the cylinder 1.

For adjusting the roller 53 to varying thickness of scale (if any) on the upper pipe 21, the spindle 50 is formed at its inner end, which in the position of the roller 53 previously described bears against a shoulder 54 around the inside of the arm 49, with a diametrically reduced screw-threaded shank 50' which projects beyond the other end of the arm 49, the outer end of the shank 50' having a handle 55. On the screw-threaded shank 50' is a correspondingly threaded sleeve 56 having a circumferential groove or recess 56' of suitable length in the direction of the shank 50', the sleeve 56 being turned along the shank 50' for a suitable distance within the arm 49 until the inner or farthest end of the groove 56' is in position for engagement by the corresponding side of a pin or screw 57 inserted through the wall of the arm 49 into the groove 56' as shown in Fig. 5. Around the shank 50' between the inner end of the sleeve 56 and the shoulder 54 within the arm 49 is a spiral spring 58 which normally forces and retains the inner end of the spindle 50 against the shoulder 54, or with the roller 53 in the position shown, but when the latter in traveling along the pipe 21 encounters an increased thickness of scale thereon, it is forced outward, and in so doing the spindle 50 with its shank 50' is correspondingly moved and causes the sleeve 56 to compress the spring 58 to the limit allowed by the pin 57 within the groove 56', or until the thickness of the scale is reduced and allows the roller 53 to be returned by the spring 58 to its original position. Furthermore, in case of an initially abnormal thickness of scale on the pipe 21, by turning the shank 50' by its handle 55 through the sleeve 56 and with it the spindle 50 and roller 53 until the latter is the desired distance from the pipe 21, the distance between the rollers 45 and 53 may be increased. The roller 53 is held in the vertical position as shown preferably, by a bolt or pawl 59 which is arranged within a socket 60 formed in the inner end of a circular box 61 projecting from one side of the arm 49, the corresponding end of the bolt 59, which passes through an opening in the said side, engaging in a groove 62 formed longitudinally in the periphery of the spindle 50. On the bolt 59 is a collar 59', and between the latter and the bottom of the socket 60 is a spiral spring 63 which normally holds the bolt 59 in engagement with the spindle 50 and thereby locks the roller 53 in the vertical position. On the outer end of the bolt 59, which projects through the bottom of the socket 60 beyond the outer end of the box 61, is fixed a circular cap or handle 64 which when the bolt 59 is in engagement with the spindle 50, fits partly within and bears upon the outer end of the box 61, whereby, when it is necessary to place the roller 53 in the horizontal position for enabling it to be initially passed between the succeeding pipe (not shown) above the pipe 21 and the latter, previous to its adjustment in the vertical position at the side of the pipe 21, by pulling the handle 64 against the spring 63, the bolt 59 is withdrawn from engagement with the spindle 50 and the latter with the roller 53 then turned until the roller 53 is horizontal, when the bolt 59 being released it is forced by the spring 63 into engagement with a second groove 62' formed longitudinally in the periphery of the spindle 50 at an angle of 90° from the groove 62, thereby locking the roller 53 in the horizontal position.

A locking device 65 similar to the spring-bolt and box 59, 61, for the spindle 50, and therefore needing no further description, projects from the sleeve 48 carrying the arm 49, for enabling the sleeve 48 with the arm 49 to be locked in the position shown, or to be partly rotated and locked with the arm 49 in a position parallel to the pipe 21 in lieu of at right-angles thereto. Furthermore, a locking device 66 (Figs. 1, 3, and 8) projects from one of the yokes 31 for locking the cylinder 1 thereto while placing the latter in position around the pipe to be cleaned, the locking device 66 being similar to the spring-bolt and box 59, 61, before described, excepting that the outer cap 64' to which the bolt 59' is fixed is formed internally with a projection 67, which when the bolt 59' is released and thrown by its spring 63' into engagement with a socket $59^2$ in the cylinder 1, engages in a correspondingly shaped slot 67' in the wall of the box 61' and thereby locks the cylinder 1 to the yokes 31, a similar slot $67^2$ being formed in the said wall diametrically opposite to the slot 67', so that, on partly rotating the cap 64' when the bolt 59' is withdrawn from engagement with the cylinder 1, the projection 67 rides on the outer edge of the box 61' and thereby holds the bolt 59' in its disengaged position. A shallow depression 68 is, also, preferably formed in the said edge intermediate to the slots 67', $67^2$, and adapted for engagement by the projection 67 for locking the cap 64' and so positively obviating accidental locking of the cylinder 1 during its rotation.

Referring particularly to Figs. 9 and 10, it is to be noted that, the pawl 38' for engaging the ratchet teeth 38 of the sleeve 37 fixed on the drive shaft 34, projects from a circular block or piston 69 which is slidable within a cylindrical chamber or housing 70 projecting from the hub 39' of the handle or lever 39, and closed at its outer end by a circular cover 71. From the block 69 projects a bolt 72 which passes through the cover 71 and through a circular cap or bush 73 rotatable around and slidable partway along the cover 71, the outer end of the bolt 72 being fixed to an outer circular cap 73' which normally bears endwise against and is rotatable and slidable partway on the cap 73. Around the bolt 72 between the block 69 and the inner face of the cover 71 is a spiral spring 75 and between the caps 73, 73', a spiral spring 75'. In the outer face of the cover 71 is a circular socket 76 which when the pawl 38' is in engagement with the ratchet-teeth 38 as shown in Fig. 9 for rotating the shaft 34 and cylinder 1 to the right, or in the forward direction as indicated by the arrows seen in Figs. 9, 1, and 4, respectively, with the heel $x$ of the pawl 38' just clear of the teeth 38 for allowing the beveled end of the pawl 38' to ride idly over the teeth 38 on rotation of the handle or lever 39 to the left, is engaged by a pin 77 projecting from the inner face of the cap 73, which in this position of the pawl 38' is sufficiently clear of the cover 71 as shown, and thereby holds the pawl 38' in its said engagement, but when it is desired to rotate the shaft 34 and cylinder 1 in either direction, the cap 73 is pulled outward so as to withdraw and disengage the pin 77 from the socket 76, and the cap 73 then partly rotated until its pin 77 engages in a second socket 76' (Fig. 10) formed in the cover 71 at a suitable distance from and deeper than the socket 76 whereby owing to the resilience of the spring 75, the pawl 38' is thrown farther into engagement with the ratchet-teeth 38, or so that its heel $x$ engages therewith, whereby the shaft 34 and cylinder 1 can be rotated in either the forward or reverse direction. When desired to rotate the shaft 34 and cylinder 1 to the left reverse direction only, the outer cap 73' to which the bolt 72 is fixed is pulled outward against the spring 75 until the pawl 38' is withdrawn from the teeth 38 when by partly rotating the cap 73' and with it the pawl 38' through a semicircle or 180° the pawl 38' will be reversed or moved into position for engaging the teeth 38 in the opposite direction, when by releasing the cap 73' and adjusting the cap 73 as before, the operation is the same as described when rotating the shaft 34 and cylinder 1 to the right. From the outer face of the cap 73 projects a pin 77' which is adapted to engage in either of a series of sockets 78 (preferably four at an angle of 90° apart as shown) for gaging or determining the position of the pawl 38' and locking it therein, the spring 75' operating to retain the cap 73 in place while adjusting the outer cap 73', and to force the pin 77 on the cap 73 into engagement with the sockets 76, and 76', respectively. Projecting from each yoke 31 along the outside of the leg 32 of the cylinder supporting member and integral therewith, is a lug 79 which is adapted for the attachment thereto of a suitable motor.

I claim:

1. In a pipe cleaner of the class described, the combination with a cylinder revoluble around the pipe, of a circular cutter axially mounted in the wall of and projecting partly into the cylinder, a resilient member fixed to the said wall and adapted to bear on the axis of the said cutter, and positive means on the cylinder for engagement therewith for limiting the outward movement of said cutter.

2. In a pipe cleaner of the class described, the combination with a cylinder revoluble around the pipe, of a series of diametrically equal circular cutters axially mounted parallel to each other side by side in the wall of and projecting partly into the cylinder, and a member fixed to the said wall and adapted to project between the said cutters in approximate engagement with the sides and peripheral cutting edges thereof for maintaining the cutters clean.

3. In a pipe cleaner of the class described, the combination with a cylinder revoluble around the pipe, of a cutter adjustably fixed to the front end of the cylinder and having its cutting edge in advance of the said end and projecting inward beyond the wall of the cylinder toward the said pipe.

4. In a pipe cleaner of the class described, the combination with a cylinder revoluble around the pipe, of a cutter adjustably fixed to the front end of the cylinder and having two cutting edges, one of the said edges projecting beyond the wall of the cylinder inward toward the said pipe, and the other edge projecting beyond the said wall outward toward a succeeding pipe.

5. In a pipe cleaner of the class described, the combination with a cylinder revoluble around the pipe, of a scraper adjustably fixed to the rear end of the cylinder and having its scraping edge projecting beyond the wall of the cylinder toward the said pipe.

6. In a pipe cleaner of the class described, the combination with a cylinder revoluble around the pipe, of cutting means carried by the cylinder, and scraping means carried by the cylinder and projecting beyond the end thereof inwardly for engagement with the pipe to be scraped and following the said cutting means.

7. In a pipe cleaner, the combination with a cylinder rotatable about the pipe, of a supporting member for the cylinder, a drive shaft journaled in the supporting member and operatively connected to the cylinder for rotating the same, a ratchet on the shaft, a lever revoluble about the ratchet, a pawl carried by the lever and adapted to engage with the ratchet, means for adjusting the pawl for engaging the teeth on movement of the lever when rotating the lever in one direction and riding idly over the ratchet teeth on movement of the lever in the opposite direction, and means for adjusting the pawl to engage positively the ratchet teeth on movement of the lever in either direction.

8. In a pipe cleaner, the combination with a cylinder rotatable about the pipe, of a supporting member for the cylinder, a drive shaft journaled in the supporting member and operatively connected to the cylinder for rotating the same, a ratchet on the shaft, a lever revoluble about the ratchet, a pawl carried by the lever and adapted to engage with the ratchet, and means for selectively adjusting the pawl to free the same of the ratchet, to engage operatively the ratchet on swinging of the lever in one direction only, or to engage operatively the ratchet on movement of the lever in either direction.

9. In a pipe cleaner, the combination with a cylinder rotatable about the pipe, of a supporting member for the cylinder, a drive shaft journaled in the supporting member and operatively connected to the cylinder for rotating the same, a ratchet on the shaft, a lever revoluble about the ratchet, a pawl carried by the lever and adapted to engage with the ratchet, means for selectively adjusting the pawl to free the same of the ratchet, to engage operatively the ratchet on swinging of the lever in one direction only, or to engage operatively the ratchet on movement of the lever in either direction, and means for reversing the position of the pawl relatively to its engagement with the ratchet teeth.

10. In a pipe cleaner, the combination with a cylinder rotatable about the pipe, of a supporting member for the cylinder, means for rotating the cylinder, a bar adjustably carried by the supporting member, adjustably spaced members carried by the bar and adapted to straddle a succeeding pipe, and means for moving one of said spaced members to a plane parallel to the said pipes for facilitating the positioning and removal of the cleaner.

11. In a pipe cleaner of the class described, the combination with a cylinder revoluble around the pipe, of a supporting member adapted to carry and permit of the rotation of the cylinder, while preventing the same from longitudinal movement relatively to the said member, a drive shaft, a bearing for the said shaft in the said member, a gear wheel fixed on the said shaft, a gear wheel fixed on the cylinder and adapted to be engaged by the first-named wheel, a sleeve fixed on the said shaft, teeth formed in and around the said sleeve, a lever fulcrumed on and movable around the sleeve, a pawl carried by the lever and adapted to engage the said teeth for rotating the said shaft positively in either direction by a corresponding movement of the lever, means for adjusting the said pawl for engaging the said teeth on the movement of the lever when rotating the said shaft in one direction, and riding idly over the said teeth on the movement of the lever in the other direction, and means for reversing the position of the pawl relatively to its engagement with the said teeth.

12. In a pipe cleaner of the class described, the combination with a cylinder revoluble around the pipe, of a supporting member adapted to carry and permit of rotation of the cylinder, means carried by the said member for engaging and rotating the cylinder, a bar carried by the said member at right-angles normally to the axis of the cylinder, two opposite rollers pivotally mounted on projecting parts of the said bar and revoluble in planes parallel thereto, one on each side of and approximate peripherally to a succeeding pipe adjacent to the first-named pipe, means for adjusting the distance between the said rollers, and means for moving one of the said rollers into a plane parallel to the said pipes.

13. In a pipe cleaner of the class described, the combination with a cylinder revoluble around the pipe, of a supporting member adapted to carry and permit of rotation of the cylinder, a bar carried by the said member at right-angles normally to the axis of the cylinder, a roller pivotally mounted on a projecting part of the bar and revoluble in a plane parallel to the said bar the said roller being approximate peripherally to one side of a succeeding pipe adjacent to the first-named pipe, a tubular arm carried by and rotatably adjustable longitudinally about the said bar in a plane at right-angles thereto, a spindle slidable within and projecting beyond one end of the said arm, a pin projecting from the spindle at right-angles thereto, a roller pivotally mounted on the said pin and revoluble in a plane normally parallel to the first-named roller, and approximate peripherally to the other side of the said succeeding pipe, means for adjusting the distance between the said rollers, and means for moving the last-named roller into a plane at right-angles to its normal position.

14. In a pipe cleaner of the class described, the combination with a cylinder revoluble around the pipe, of a supporting member adapted to carry the cylinder, a bar carried by the said member, an arm carried by the said bar at right-angles thereto, a spindle slidable within and projecting beyond one end of the arm, a pin projecting from the spindle at right-angles thereto, a roller pivotally mounted on the said pin and revoluble in a plane normally parallel to the said bar and approximate peripherally to one side of a succeeding pipe adjacent to the first named pipe, and resilient means for enabling the said roller to be automatically moved outward from the said succeeding pipe by abnormal resistance of scale thereon, and returned to its normal position when said resistance is removed.

15. In a pipe cleaner of the class described, the combination with a cylinder revoluble around the pipe, of a supporting member adapted to carry the cylinder, a bar carried by the said member, a tubular arm carried by the said bar at right-angles thereto, a spindle slidable within and projecting beyond one end of the arm, a pin projecting from the spindle at right-angles thereto, a roller pivotally mounted on the said pin and revoluble in a plane normally parallel to the said bar and approximate peripherally to one side of a succeeding pipe adjacent to the first-named pipe, a shoulder around the inside of the arm, a screw-threaded shank projecting from the spindle through the other end of the arm, a screw-threaded sleeve engaging and rotatably adjustable on the said shank and having a circumferential groove within the arm, a spring surrounding the said shank between the inner end of the sleeve and the said shoulder, and a pin projecting through the wall of the arm into the said groove.

16. In a pipe cleaner of the class described, the combination with a cylinder revoluble around the pipe, of a supporting member adapted to carry and permit of rotation of the cylinder, a bar carried by the said member, and means for adjustably fixing the said bar to the said member in a plane at right-angles to the axis of the cylinder.

17. In a pipe cleaner, the combination with a cylinder rotatable about the pipe, of a supporting member for the cylinder, means for rotating the cylinder, a bar carried by the supporting member, spaced members carried by the bar and adapted to straddle a succeeding pipe, and means for moving one of said spaced members to a plane parallel to the said pipes for facilitating the positioning and removal of the cleaner.

18. In a pipe cleaner, the combination with a cylinder rotatable about the pipe, of a supporting member for the cylinder, means for rotating the latter, a bar carried by the member, a roller carried by the bar, an arm swingingly mounted on the bar for extending transversely of a succeeding pipe against which said roller normally bears, and a member mounted on the free terminal of the swinging arm to engage the opposite portion of the succeeding pipe.

19. In a pipe cleaner, the combination with a cylinder rotatable about the pipe, of a supporting member for the cylinder, means for rotating the latter, a bar carried by the member, a roller carried by the bar, an arm swingingly mounted on the bar for extending transversely of a succeeding pipe against which said roller normally bears, and means for holding the arm in any of a plurality of dispositions.

20. In a pipe cleaner, the combination with a cylinder rotatable about the pipe, of a supporting member for the cylinder, means for rotating the latter, a bar carried by the member, a roller carried by the bar, an arm swingingly mounted on the bar for extending transversely of a succeeding pipe against which said roller normally bears, means for holding the arm in any of a plurality of dispositions, and means for securing the last member to the swinging arm in any of a plurality of adjustments.

21. In a pipe cleaner, the combination with a cylinder revoluble about the pipe, of a cutter having its axis mounted in radial bearings provided in the cylinder and projecting partly into the latter, a resilient member fixed to the said cylinder and adapted to bear on the axis of the cutter, and screw means extending into the radial bearings and adapted to engage with the axis of the cutter to prevent dislodgment of the latter.

In testimony whereof I hereunto affix my signature in the presence of two witnesses.

ALBIN C. EEK.

Witnesses:
 WALTER C. GUELS,
 NANCY C. THOMAS.